United States Patent
Pan et al.

(10) Patent No.: US 12,027,706 B2
(45) Date of Patent: Jul. 2, 2024

(54) AMORPHOUS CARBON MATERIAL, PREPARATION METHOD AND USE THEREOF

(71) Applicants: China Energy Investment Corporation Limited, Beijing (CN); National Institute of Clean-and-Low-Carbon Energy, Beijing (CN)

(72) Inventors: Guanghong Pan, Beijing (CN); Wenbin Liang, Beijing (CN); Kun Tang, Beijing (CN); Yajun Tian, Beijing (CN); Danmiao Kang, Beijing (CN); Chunting Duan, Beijing (CN); Libin Kang, Beijing (CN); Chang Wei, Beijing (CN)

(73) Assignees: China Energy Investment Corporation Limited (CN); National Institute of Clean-and-Low-Carbon Energy (CN)

( * ) Notice: Subject to any disclaimer, the term of this patent is extended or adjusted under 35 U.S.C. 154(b) by 829 days.

(21) Appl. No.: 17/056,029

(22) PCT Filed: Aug. 13, 2018

(86) PCT No.: PCT/CN2018/100258
§ 371 (c)(1),
(2) Date: Nov. 17, 2020

(87) PCT Pub. No.: WO2019/218506
PCT Pub. Date: Nov. 12, 2019

(65) Prior Publication Data
US 2021/0226214 A1    Jul. 22, 2021

(30) Foreign Application Priority Data

May 18, 2018 (CN) .......................... 201810482062.9

(51) Int. Cl.
| | | |
|---|---|---|
| *H01M 4/587* | (2010.01) | |
| *H01M 4/02* | (2006.01) | |
| *H01M 4/36* | (2006.01) | |
| *H01M 4/38* | (2006.01) | |
| *H01M 10/0525* | (2010.01) | |

(52) U.S. Cl.
CPC .......... *H01M 4/587* (2013.01); *H01M 4/364* (2013.01); *H01M 4/386* (2013.01); *H01M 10/0525* (2013.01); *H01M 2004/021* (2013.01); *H01M 2004/027* (2013.01)

(58) Field of Classification Search
CPC ...... H01M 4/587; H01M 4/364; H01M 4/386; H01M 10/0525; H01M 2004/021; H01M 2004/027
See application file for complete search history.

(56) References Cited

U.S. PATENT DOCUMENTS

| | | | |
|---|---|---|---|
| 2010/0075227 A1 | 3/2010 | Morita et al. | |
| 2010/0215567 A1* | 8/2010 | Sakamoto | H01M 4/587 |
| | | | 423/445 R |
| 2017/0033360 A1 | 2/2017 | Michaud et al. | |
| 2018/0179057 A1 | 6/2018 | Kumagai et al. | |

FOREIGN PATENT DOCUMENTS

| | | | | |
|---|---|---|---|---|
| CN | 102386384 | | 3/2012 | |
| CN | 104681786 | | 6/2015 | |
| CN | 104681786 | A1 * | 6/2015 | |
| CN | 105185997 | | 12/2015 | |
| CN | 105720233 | | 6/2016 | |
| CN | 106170880 | A | 11/2016 | |
| CN | 106170880 | A | 11/2016 | |
| CN | 106185862 | | 12/2016 | |
| CN | 106185862 | A1 * | 12/2016 | |
| CN | 105185997 | | 2/2017 | |
| CN | 106784685 | A | 5/2017 | |
| CN | 106784685 | A | 5/2017 | |
| CN | 107709230 | A | 2/2018 | |
| CN | 107709230 | A | 2/2018 | |
| EP | 349307 | A2 | 1/1990 | |
| EP | 0593785 | | 4/1994 | |
| EP | 3168909 | A1 * | 5/2017 | ............. C01B 32/20 |
| JP | 2535207 | B2 | 9/1996 | |
| JP | 2003282369 | A | 10/2003 | |
| JP | 2003282369 | A | 10/2003 | |

(Continued)

OTHER PUBLICATIONS

Search Report dated Feb. 24, 2020 from the Office Action for Chinese Application No. 201810482062.9 dated Mar. 3, 2020, pp. 1-3.

(Continued)

*Primary Examiner* — Christopher P Domone
*Assistant Examiner* — Jonathan William Estes
(74) *Attorney, Agent, or Firm* — Lerner David LLP

(57) ABSTRACT

The present disclosure relates to the field of carbon materials, in particular to an amorphous carbon material and a preparation method and an use thereof. The amorphous carbon material has the following characteristics: (1) the true density $\rho$ of the amorphous carbon material and the interlayer spacing $d_{002}$ obtained by powder XRD spectrum analysis satisfy the relational formula: $100 \times \rho \times d_{002} \geq 70$; (2) the interlayer spacing $d_{002}$, $L_a$ and $L_c$ satisfy the following relational formula: $L_c \lambda d_{002} \leq 0.58$; and $100 \times (L_c/L_a^2) \times d_{002}^3 \leq 0.425$; (3) the amorphous carbon material contains 0.001-2% of a silicon component and 0.001-2% of an aluminum component, based on the total mass of the amorphous carbon material. The amorphous carbon material prepared by the present disclosure has desirable heat transfer performance and can provide high battery capacity.

16 Claims, No Drawings

(56) References Cited

FOREIGN PATENT DOCUMENTS

JP          2016201419  A      12/2016
JP          2016201419  A      12/2016

OTHER PUBLICATIONS

International Search Report (w/ English translation) and Written Opinion for corresponding PCT Application No. PCT/CN2018/100258 dated Feb. 25, 2019—9 pages.

* cited by examiner

AMORPHOUS CARBON MATERIAL, PREPARATION METHOD AND USE THEREOF

PRIORITY CLAIM

This application is a national stage application, filed under 35 U.S.C. § 371, of International Patent Application No. PCT/CN2018/100258, filed on Aug. 13, 2018, which claims the benefit of priority of Chinese Patent Application No. 201810482062.9, filed on May 18, 2018, both of which are incorporated by reference herein in their entirety.

FIELD

The present disclosure relates to the field of carbon materials, in particular to an amorphous carbon material and a preparation method and a use thereof.

BACKGROUND

In the field of secondary batteries, especially lithium ion secondary batteries, the graphite materials have currently emerged as the key anode materials for commercial lithium ion batteries due to their characteristics of high electronic conductivity, small volume change of layered structures before and after lithium intercalation, high lithium intercalation capacity, low lithium intercalation potential and the like. The secondary batteries can be recycled for many times, and the secondary batteries are available following a charging process after the electric quantity is fully discharged.

With the development of secondary battery technologies, the requirements on the anode materials are increasingly stringent, the amorphous carbon materials have gradually attracted industrial attentions. The amorphous carbon materials have the advantages of large interlayer spacing, excellent compatibility with electrolyte, high diffusion rate of lithium ions in the amorphous carbon materials, desirable heat-transfer capability and the like, thus the amorphous carbon materials have wide application prospect in the fields of electric vehicles, frequency modulation and peak load regulation power grids and large-scale energy storage.

CN105720233A discloses a carbon material for lithium ion battery negative electrode, and a preparation method for the carbon material for lithium ion battery negative electrode, the method comprising: performing polymerization on the coal liquefaction residues; stabilizing the polymerization product, and performing carbonization on the stabilized product.

CN104681786A discloses a coal-based anode material consisting of a coal-based material graphitized inner layer, a middle layer and an outer layer distributed on the surface, and a method for preparing the coal-based anode material. The preparation method comprises the following steps: crushing the coal-based material; then adding a binder, or mixing the binder with a modifier; then performing pressing and graphitization at high temperature to form a finished product. The material has an average grain diameter $D_{50}$ of 2-40 μm, an interlayer spacing $d_{002}$ of 0.335-0.337 nm, a specific surface area of 1-30 m$^2$/g, a fixed carbon content more than or equal to 99.9%, and a true density more than or equal to 2 g/cm$^3$.

CN105185997A discloses a sodion secondary battery negative electrode material, a preparation method and a use thereof. The material is an amorphous carbon material, and is prepared by taking the coal and a hard carbon precursor as raw materials, adding a solvent and mechanically mixing the raw materials, drying the mixture, and then subjected to crosslinking, solidifying and splitting in an inert atmosphere. The material has an average grain diameter of 1-50pin, an interlayer spacing $d_{002}$ of 0.35-0.42 nm, $L_c$ of 1-4 nm, and $L_a$ of 3-5 nm.

The above patent documents have disclosed various carbon materials and methods for preparing the same, the preparation methods have complicated and tedious operation steps, and the prepared carbon materials are mainly used for improving the battery capacity without considering how to improve the heat transfer capacity, which will affect the safety and service life of the battery.

SUMMARY

In regard to the above problems in the prior art, the present disclosure aims to provide a novel amorphous carbon material, and a preparation method and a use thereof.

In order to fulfill the purpose, a first aspect of the present disclosure provides an amorphous carbon material having the following characteristics:

(1) a true density p of the amorphous carbon material and a interlayer spacing $d_{002}$ obtained by powder X-Ray Diffraction (XRD) spectrum analysis satisfy the following relational formula:

$$100 \times \rho \times d_{002} \geq 70 \quad \text{Formula (I)};$$

(2) the interlayer spacing $d_{002}$, $L_a$, and $L_c$ of the amorphous carbon material obtained by powder XRD spectrum analysis satisfy the following relational formula:

$$L_c \times d_{002} \leq 0.58 \quad \text{Formula (II), and}$$

$$100 \times (L_c/L_a^2) \times d_{002}^3 \leq 0.425 \quad \text{Formula (III)};$$

(3) the amorphous carbon material contains 0.001-2% by weight of a silicon component and 0.001-2% by weight of an aluminum component in term of element, based on the total mass of the amorphous carbon material; wherein ρ is denoted by the unit of g/cm$^3$, each of $d_{002}$, $L_c$ and $L_a$ is denoted by the unit of nm.

In a second aspect, the present disclosure provides a method for preparing the amorphous carbon material, and the method comprises the following steps:

(1) providing carbonaceous material powder with a carbon element content more than 70% as a carbon source;
(2) providing a silicon-aluminum source, wherein the silicon-aluminum source is a combination of a silicon-containing substance and an aluminum-containing substance, or a substance containing both silicon and aluminum;
(3) mixing the carbonaceous material powder, the silicon-aluminum source, and an aqueous solution containing a surfactant, then subjecting the mixture to a phase separation, and drying the obtained solid to obtain the dried powder;
(4) carbonizing the dried powder under vacuum or an inert atmosphere.

In a third aspect, the present disclosure provides an amorphous carbon material prepared with the above method.

In a fourth aspect, the present disclosure provides a use of the aforementioned amorphous carbon material as a material for a mechanical component, a battery electrode material or a heat conduction material.

The amorphous carbon material of the present disclosure has higher thermal diffusion coefficient and desirable heat transfer performance, and can be used as an anode material of a battery to enable that the battery has high capacity, so as to expand its application field; in addition, as compared with the prior art, the method provided by the present disclosure has the characteristic of simple operation.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

In a first aspect, the present disclosure provides an amorphous carbon material having the following characteristics:
(1) a true density ρ of the amorphous carbon material and a interlayer spacing $d_{002}$ obtained by powder X-Ray Diffraction (XRD) spectrum analysis satisfy the following relational formula:

$$100 \times \rho \times d_{002} \geq 70 \quad \text{Formula (I);}$$

(2) the interlayer spacing $d_{002}$, $L_a$ and $L_c$ of the amorphous carbon material obtained by powder XRD spectrum analysis satisfy the following relational formula:

$$L_c \times d_{002} \leq 0.58 \quad \text{Formula (II), and}$$

$$100 \times (L_c/L_a^2) \times d_{002}^3 \leq 0.425 \quad \text{Formula (III);}$$

(3) the amorphous carbon material contains 0.001-2% by weight of a silicon component and 0.001-2% by weight of an aluminum component in term of element, based on the total mass of the amorphous carbon material;
wherein ρ is denoted by the unit of g/cm³, each of $d_{002}$, $L_c$ and $L_a$ is denoted by the unit of nm.

In the present disclosure, the contents of silicon component and aluminum component are measured by an Inductively Coupled Plasma Emission Spectrometer (ICP).

Preferably, $70 \leq 100 \times \rho \times d_{002} \leq 120$, further preferably $70 \leq 100 \times \rho \times d_{002} \leq 100$, and more preferably $70 \leq 100 \times \rho \times d_{002} \leq 90$.

Preferably, $0.1 \leq L_c \times d_{002} \leq 0.58$, further preferably $0.3 \leq L_c \times d_{002} \leq 0.58$, more preferably $0.45 \leq L_c \times d_{002} \leq 0.58$.

Preferably, $0.1 \leq 100 \times (L_c/L_a^2) \, d_{002}^3 \leq 0.425$, further preferably $0.2 \leq 100 \times (L_c/L_a^2) \times d_{002}^3 \leq 0.425$, more preferably $0.25 \leq 100 \times (L_c/L_a^2) \times d_{002}^3 \leq 0.425$, most preferably $0.28 \leq 100 \times (L_c/L_a^2) \times d_{002} \leq 0.425$.

According to the present disclosure, the amorphous carbon material has an interlayer spacing $d_{002}$ obtained by powder XRD spectrum analysis within a range of 0.34-0.4 nm, preferably 0.35-0.395 nm, more preferably 0.355-0.39 nm.

According to the present disclosure, the amorphous carbon material has a $L_a$ value obtained by Raman analysis within a range of 3-6 nm, preferably 4-5 nm, further preferably 4.1-4.75 nm, more preferably 4.2-4.7 nm.

According to the present disclosure, the amorphous carbon material has a $L_c$ value obtained by powder XRD spectrum analysis within a range of 1-1.9 nm, preferably 1.1-1.8 nm, further preferably 1.1-1.6 nm, more preferably 1.2-1.55 nm.

According to the present disclosure, the thermal diffusion coefficient of the amorphous carbon material is larger than or equal to 0.09 mm²·s⁻¹, preferably larger than or equal to 0.095 mm²·s⁻¹, further preferably larger than or equal to 0.1 mm²·s⁻¹, and more preferably larger than or equal to 0.12 nm²·s⁻¹.

According to the present disclosure, the amorphous carbon material may be in the form of powder having a particle diameter $D_{50}$ within a range of 2-50 μm, preferably 3-40 μm, more preferably 5-30 μm.

According to one embodiment, the amorphous carbon material has a true density ρ of 1.0-2.5 g/cm³, preferably 1.3-2.5 g/cm³, more preferably 1.8-2.3 g/cm³.

In a second aspect, the present disclosure provides a method for preparing an amorphous carbon material, and the method comprise the following steps:
(1) providing carbonaceous material powder with a carbon element content more than 70% as a carbon source;
(2) providing a silicon-aluminum source, wherein the silicon-aluminum source is a combination of a silicon-containing substance and an aluminum-containing substance, or a substance containing both silicon and aluminum;
(3) mixing the carbonaceous material powder, the silicon-aluminum source, and an aqueous solution containing a surfactant, then subjecting the mixture to a phase separation, and drying the obtained solid to obtain the dried powder; and
(4) carbonizing the dried powder under vacuum or an inert atmosphere.

In the present disclosure, the content of carbon element means a mass percentage content measured by an Inductively Coupled Plasma Emission Spectrometer (ICP). For example, the content of carbon element in the carbonaceous material powder may be within a range of 75-100%, preferably 80-100%.

In the step (1), the carbonaceous material powder having a carbon element content larger than 70% may be at least one selected from the group consisting of pitch, coal and coke. Wherein the softening point of the coal pitch may be within a range of 30-360° C., and preferably 40-350° C. The softening point of the petroleum asphalt may be within a range of 40-360° C., preferably 40-350° C. The softening point of the mesophase pitch may be within a range of 200-360° C., The mesophase pitch generally has a mesophase content of 20-100%.

Specifically, the carbonaceous material may be coal pitch having a softening point of 40° C., 50° C., 100° C., 110° C., 120° C., 130° C., 140° C., 150° C., 200° C., 250° C., 320° C., 350° C. and any value within a range formed by any two of these point values; or petroleum asphalt having a softening point of 40° C., 45° C., 50° C., 60° C., 70° C., 80° C., 90° C., 100° C., 150° C., 200° C., 250° C., 320° C., 350° C., 360° C. and any value within a range formed by any two of these point values; or mesophase pitch having a softening point of 220° C., 250° C., 260° C., 280° C., 300° C., 310° C., 320° C., 330° C., 340° C., 360° C. and any value within a range formed by any two of these point values. In addition, the mesophase content of the mesophase pitch may be 20%, 40%, 50%, 60%, 80%, 90%, 95%, 97%, 100%, and any value within a range formed by any two of these point values.

In step (1), the carbonaceous material powder may have an average particle diameter $D_{50}$ within a range of 1-100 μm, the average particle diameter $D_{50}$ is preferably within a range of 2-100 μm. Specifically, the average particle diameter $D_{50}$ may be 1 μm, 2 μm, 3 μm, 5 μm, 10 μm, 12 μm, 20 μm, 25 μm, 30 μm, 35 μm, 40 μm, 50 μm, 60 μm, 70 μm, 80 μm, 90 μm, 100 μm, and any value within a range formed by any two of these point values.

The carbonaceous material powder may be obtained in any desired manner which may be a conventional choice in the art, for example, obtained by mechanically pulverizing carbonaceous material as a carbon source, the mechanical pulverization may be selected with reference to the prior art, for example, it is selected from but not limited to jaw pulverization, air jet pulverization, extrusion crushing, impact crushing, mill crushing, fracture splitting crushing, hydraulic crushing, explosive crushing and the like.

In the step (2), the silicon-aluminum source is a combination of a silicon-containing substance and an aluminum-containing substance, or a substance containing both silicon and aluminum. In the amorphous carbon material, the silicon and aluminum exist mainly in the form of $SiO_2$ and $Al_2O_3$, respectively. It shall be comprehended by those skilled in the art that the amorphous carbon material may contain a small amount of other forms of silicon and aluminum, such as undecomposed silicoaluminum source per se, or the silicon compounds, aluminum compounds and silicon aluminum compounds formed during the carbonization process.

In the step (2), the silicon-containing substance may be at least one selected from the group consisting of monatomic silicon (e.g., nanometer silicon, micrometer silicon), silicon oxide, silicic acid, silicate (e.g., sodium silicate), optical fiber glass, silicon carbide, and organosilicon.

The aluminium-containing material may be at least one selected from the group consisting of monatomic aluminium, meta-aluminate (e.g., sodium meta-aluminate), alumina, bauxite, aluminium hydroxide and aluminium salt of inorganic or organic acids (e.g., potassium aluminium sulphate dodecahydrate).

The material containing both silicon and aluminum may be at least one selected from the group consisting of silicon-aluminum composite oxides (e.g., $Al_2SiO_5$ and $Al_2(SiO_3)_3$), aluminosilicate (e.g., sodium aluminosilicate), zeolite, kaolin, and fly ash.

In order to facilitate mixing with the carbonaceous material powder, the silica-alumina source in step (2) is generally in a powder form, and may have an average particle diameter $D_{50}$ within a range of 1-100 μm, for example, 1 μm, 2 μm, 3 μm, 5 μm, 10 μm, 20 μm, 30 μm, 40 μm, 50 μm, 60 μm, 70 μm, 80 μm, 90 μm, 100 μm, or any value within a range formed by any two of these point values.

According to the present disclosure, the introduction of silicon and aluminum into the amorphous carbon material can improve the thermal diffusion coefficient of the amorphous carbon material of the present disclosure, or provide a battery prepared from the amorphous carbon material with a higher battery capacity.

In the step (3), the concentration of the surfactant-containing aqueous solution may be within a range of 0.001-50 wt %, preferably 0.01-20 wt %, more preferably 0.01-10 wt %. Specifically, the concentration of the aqueous solution may be, for example, 0.001 wt %, 0.01 wt %, 0.1 wt %, 0.2 wt %, 0.5 wt %, 1 wt %, 2 wt %, 3 wt %, 5 wt %, 10 wt %, 15 wt %, 20 wt %, 25 wt %, 30 wt %, 35 wt %, 40 wt %, 45 wt %, 50 wt %, and any value within a range formed by any two of these point values.

The surfactant may be used in an amount of 0.005-250 parts by weight, preferably 0.01-100 parts by weight, and more preferably 0.05-50 parts by weight, relative to 100 parts by weight of the carbonaceous material powder in step (3); specifically, for example, the amount may be 0.005 parts by weight, 0.05 parts by weight, 0.1 parts by weight, 0.2 parts by weight, 0.5 parts by weight, 1 part by weight, 5 parts by weight, 10 parts by weight, 15 parts by weight, 20 parts by weight, 25 parts by weight, 30 parts by weight, 50 parts by weight, 100 parts by weight, 250 parts by weight, and any value within a range formed by any two of these point values.

According to a specific embodiment, the surfactant is used in an amount of 0.05-50 parts by weight relative to 100 parts by weight of the carbonaceous material powder, wherein the aqueous solution has a concentration of 0.01-10 wt %.

The present disclosure does not impose limitation to the preparation mode of the surfactant-containing aqueous solution, as long as the surfactant can be dissolved to form a homogeneous solution, and the dissolution may be performed under a high temperature condition (e.g., 50-85° C.) so as to expedite dissolution of the surfactant.

In the step (3), the surfactant may be selected from an anionic surfactant and/or a cationic surfactant.

Preferably, the anionic surfactant is at least one selected from the group consisting of arabic gum, sodium carboxymethylcellulose, $C_8$-$C_{12}$ fatty acid salts (e.g., sodium stearate), $C_{12}$-$C_{20}$ alkyl sulfonates (e.g., sodium hexadecyl sulfonate), alkyl benzene sulfonates (e.g., sodium dodecyl benzene sulfonate), and $C_{12}$-$C_{18}$ fatty alcohol sulphates (e.g., sodium lauryl sulphate).

The cationic surfactant may be at least one selected from the group consisting of the quaternary ammonium type cationic surfactants, preferably selected from the group consisting of the $C_{10}$-$C_{22}$ alkyltrimethylammonium type cationic surfactants, the di-($C_{10}$-$C_{22}$) alkyldimethylammonium type cationic surfactants, and the $C_{10}$-$C_{22}$ alkyldimethylbenzylammonium type cationic surfactants. Examples of the quaternary ammonium type cationic surfactant may comprise, but are not limited to one of decyl trimethyl ammonium chloride, undecyl trimethyl ammonium chloride, dodecyl trimethyl ammonium chloride, tridecyl trimethyl ammonium chloride, tetradecyl trimethyl ammonium chloride, pentadecyl trimethyl ammonium chloride, hexadecyl trimethyl ammonium chloride, heptadecyl trimethyl ammonium chloride, octadecyl trimethyl ammonium chloride, nonadecyl trimethyl ammonium chloride, eicosyl trimethyl ammonium chloride, decyl dimethyl benzyl ammonium chloride, undecyl dimethyl benzyl ammonium chloride, dodecyl dimethyl benzyl ammonium chloride, tridecyl dimethyl benzyl ammonium chloride, tetradecyl dimethyl benzyl ammonium chloride, pentadecyl dimethyl benzyl ammonium chloride, hexadecyl dimethyl benzyl ammonium chloride, heptadecyl dimethyl benzyl ammonium chloride, octadecyl dimethyl benzyl ammonium chloride, nonadecyl dimethyl benzyl ammonium chloride, eicosyl dimethyl benzyl ammonium chloride or a combination thereof.

More preferably, the surfactant is at least one selected from the group consisting of arabic gum, sodium carboxymethylcellulose, dodecyl dimethyl benzyl ammonium chloride and hexadecyl trimethyl ammonium chloride.

In step (3), the mixing is usually carried out under the stirring conditions, and the mixing temperature may be within a range of 1-99° C., preferably 15-90° C. Specifically, for example, the mixing temperature may be 1° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C. and any value within a range formed by any two of these point values. The stirring speed can be specifically set according to the actual conditions, and pursuant to the principle that the purpose of the present disclosure can be achieved. The desired temperature can be obtained in any conceivable manner, for example by heating with a water bath, or heating with an alcohol lamp. The stirring time is within a range of 0.5-30 hours, preferably 1-10 hours, more preferably 2-8 hours. The stirring speed can be specifically set according to the actual conditions, and the principle of the present disclosure can be realized.

In the step (3), the modes and the operation conditions of the phase separation are not particularly limited in the present disclosure, both may be selected with reference to the prior art, for example, the phase separation may be performed by means of removing the supernatant liquid after standing still, or by means of centrifugation.

In step (3), the drying manner and the operation conditions can be selected according to the prior art, the drying process can be performed by a well-known manner in the art, such as heating drying, vacuum drying or natural drying. According to a preferred embodiment, the drying is vacuum drying at a temperature within a range of 80-130° C. for a time of 1-30 hours.

It is preferable in the step (4) that the carbonization temperature is within a range of 900-1,600° C. and the carbonization time is within a range of 1-20 hours. Specifically, for example, the carbonization temperature may be 900° C., 1,000° C., 1,100° C., 1,200° C., 1,300° C., 1,400° C., 1,500° C., 1,600° C. and any value within a range formed by any two of these point values; the carbonization time may be determined as required, it may be several hours, and the carbonization time may be 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, and any value within a range formed by any two of these point values.

In step (4), the dried powder is subjected to carbonization under vacuum or an inert atmosphere. If the carbonization is performed under vacuum, it is preferable that the carbonization is performed under a relative vacuum degree of −40 kPa to −101.325 kPa, specifically, the relative vacuum degree may be −40 kPa, −50 kPa, −60 kPa, −70 kPa, −80 kPa, −90 kPa, −101.325 kPa, and any value within a range formed by any two of these point values. If the carbonization is performed under an inert atmosphere, the inert atmosphere may be, for example, one of nitrogen gas, argon gas or a mixture thereof. In addition, the carbonization may be performed at one temperature for a period of time, and then the temperature is raised to continue the carbonization (i.e., multi-step carbonization), or may be performed by direct carbonization at the same temperature (i.e., one-step carbonization).

It is optional in the present disclosure that prior to the carbonization (i.e., firing) treatment of step (4), the preparation method may further comprise pre-firing the dried powder, the pre-firing is performed under vacuum or an inert atmosphere, the pre-firing temperature is lower than the carbonization temperature.

Generally, the pre-firing temperature may be within a range of 400-800° C., for example, the pre-firing temperature may be 400° C., 450° C., 500° C., 550° C., 600° C., 650° C., 700° C., 750° C., 800° C., and any value within a range formed by any two of these point values; the pre-firing time may be several hours as required, such as 1-12 hours.

In the present disclosure, the pre-firing process and carbonization process may be performed in the same equipment, for example, in the tubular furnace section of the OTF-1200X-80-III-F3LV system commercially available from Hefei kejing Material Technology Co., Ltd. The vacuum degree and inert atmosphere involved in the pre-firing process may be selected with reference to the above carbonization process, the content is not repeated in the present disclosure.

In the present disclosure, the method may further include: performing ball milling at any stage between the step (1) and the step (4). The ball milling process causes that the powder entering the carbonization process has an average particle diameter $D_{50}$ within a range of 1-50 μm, preferably 1-40 μm, more preferably 2-30 μm, for example, the average particle diameter $D_{50}$ may be 1 μm, 5 μm, 10 μm, 15 μm, 20 μm, 25 μm, 30 μm, 35 μm, 40 μm, 50 μm and any value within a range formed by any two of these point values.

The ball milling step may be performed at any stage between the step (1), step (2), step (3), step (4) and the pre-firing operation. For example, the ball milling may be performed between step (1) and step (2), between step (2) and step (3), between step (3) and step (4), between step (3) and pre-firing, or between pre-firing and step (4). The ball milling may be carried out in one or more stages as required, and the ball milling conditions are not specifically limited in the present disclosure as long as the desired particle diameter $D_{50}$ of the powder can be obtained.

In a third aspect, the present disclosure provides an amorphous carbon material prepared with the method according to the second aspect of the present disclosure.

In a fourth aspect, the present disclosure provides a use of the amorphous carbon material according to the first aspect or the third aspect of the present disclosure as a material for a mechanical component, a battery electrode material or a heat conduction material.

According to the present disclosure, the amorphous carbon material is used as an anode material for a secondary battery (e.g., a lithium ion battery), such that the capacity of the battery can be increased. Specifically, according to an embodiment, when a button cell is assembled by using a negative electrode prepared by taking the carbon material of the present disclosure as an anode material and a metal lithium sheet as a reference electrode, the capacity of the button cell is more than or equal to 240 mAh/g, preferably more than or equal to 245 mAh/g, and more preferably more than or equal to 249 mAh/g.

The present disclosure will be further elaborated with reference to the examples, but the protection scope of the present disclosure is not limited thereto.

Unless otherwise specified, the following measuring methods and test instruments are applicable to the various aspects of the present disclosure described above as well as to the examples and comparative examples that will be described below.

In the following examples and comparative examples,
1. Device
1) The small-sized ultrafine grinder was purchased from Wenzhou Dingli Medical Equipment Co., Ltd., with the model number WF 18;
2) The omnibearing planetary ball mill was purchased from Changsha Miqi Instrument Equipment Co., Ltd., with the model number QM-QX;
3) The firing (including pre-firing, carbonization) process was carried out in the tube furnace section of the OTF-1200X-80-III-F3LV system commercially available from Hefei kejing Material Technology Co., Ltd.;
2. Reagents
The Arabic gum was purchased from Sinopharm Chemical Reagent Beijing Co., Ltd., with the product number 69012495, the specification of Aladine A108975, and the CAS No. 9000-01-5;
The sodium carboxymethylcellulose was purchased from Sinophann Chemical Reagent Beijing Co., Ltd., with the product number 30036328, the specification of CP300-800 (Shanghai Reagent), and the CAS No. 9004-32-4;

The phenolic resin was purchased from Sinopharm Chemical Reagent Beijing Co., Ltd., with the product number 30265876, the specification of A010024, and the carbon content of 69 wt %;

3. Tests

1) Softening Point

The softening points of asphalts were measured according to D 3104-99 Standard Test Method for Softening Point of Pitches as stipulated by the American Society for Testing Material (ASTM).

2) True Density

The true density was measured by the true densitometer AccuPyc® II 1340 manufactured by the Micrometrics Instrument Corporation in USA at the temperature of 25° C.

3) Powder XRD Analysis

The test was performed by using a D8 Advance X-ray Diffractometer manufactured by the Bruker AXS GmbH in Germany with a tube voltage of 40 kV, a tube current of 40 mA, an X-ray radiation source of Cu Kα (λ=1.54184 Å), a collection step length of 0.02°, and a collection 2θ range of 10-60°. $L_c$ was calculated according to the Scherrer Formula $L_c=K\lambda/B_{002}\cos\theta$, wherein K was the Scherrer constant, λ was the X-ray wavelength, B was the full width at half maximum (FWHM) of the diffraction peak, and θ was the diffraction angle.

4) Raman Spectrum

The test was performed by a LabRAM HR-800 type Raman Spectrometer manufactured by the Horiba Jobin Yvon S.A.S in France, wherein the laser wavelength was 532.06 nm, the slit width was 100 μm, and the scanning range was 700-2,100 cm$^{-1}$. The values $I_G$ and $I_D$ were obtained through the Raman spectrum analysis, La was calculated according to the Formula La=4.4 $I_G/I_D$.

5) Particle Diameter ($D_{50}$)

The particle diameter was tested by using a Malvern Mastersizer 2000 laser particle analyzer manufactured by the Malvern Instruments Ltd. of the United Kingdom.

6) Thermal Diffusion Coefficient

The thermal diffusion coefficient was measured with the LFA 447 laser thermal conductivity instrument manufactured by the NETZSCH Group in Germany by using a laser scattering method.

7) Battery Capacity

The battery capacity was tested by using a battery test system CT2001A battery tester manufactured by the Wuhan LAND Electronic Co., Ltd. A first charge-discharge capacity test was performed on button cells comprising anodes made of carbon materials (as carbon anode materials) prepared in the following examples and comparative examples, respectively, wherein the cells at 0.1C (1C=250mAh/g) were charged to 3.0V with a constant current, and then discharged to 0V with a constant current at the same rate, 10 button cells were measured and their capacities were averaged to obtain a measured value.

The preparation process of button cells comprises the following steps: the carbon materials (as carbon anode materials) prepared in the following examples and comparative examples were uniformly mixed with conductive carbon black Super P and a binder polyvinylidene fluoride (PVDF) in a mass ratio of 92:3:5, a solvent N-methylpyrrolidone (NMP) was added until the solid content was 48%, the materials were stirred to form an uniform negative electrode slurry, the negative electrode slurry was uniformly coated on a copper foil with a scraper, the copper foil was then placed in an oven at 80° C. and subjected to vacuum drying for 24 hours to remove the solvent. The obtained negative electrode plate was punched into a sheet with the diameter of 12 mm by a punching machine, the sheet was subjected to drying at the temperature of 80° C. for 24 hours, and subsequently transferred into an MBraun2000 glove box (Argon atmosphere, the concentrations of $H_2O$ and $O_2$ were less than 0.1×10$^{-16}$ vol %), a metal lithium sheet was used as a reference electrode to assemble the button cells.

Example 1

The mesophase pitch (with a carbon content of 98 wt % and a mesophase content of 50%) having a softening point of 260° C. was mixed with aluminum silicate ($Al_2(SiO_3)_3$) at a mass ratio of 96:4, the mixture was pulverized by a small-sized ultrafine grinder to obtain powder with particle diameter $D_{50}$=50 μm, the powder was then subjected to ball milling by an omnibearing planetary ball mill at a rotation speed of 300 rpm to obtain powder with $D_{50}$=10 μm.

The arabic gum was added to water and prepared into a solution with a concentration of 2 wt % in a water bath at 80° C. The ball-milled powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 600° C. for 10 hours under nitrogen atmosphere, then heated to 1,300° C. and subjected to firing at the temperature for 8 hours so as to prepare the amorphous carbon material with a particle diameter $D_{50}$=14 μm.

Example 2

The mesophase pitch (with a carbon content of 99 wt % and a mesophase content of 90%) having a softening point of 320° C. was mixed with aluminum silicate ($Al_2(SiO_3)_3$) at a mass ratio of 98:2, the mixture was pulverized by a small-sized ultrafine grinder to obtain powder with a particle diameter $D_{50}$=50 μm, the powder was then subjected to ball milling by an omnibearing planetary ball mill at a rotation speed of 300 rpm to obtain powder with $D_{50}$=25 μm.

The arabic gum was added to water and prepared into a solution with a concentration of 0.01 wt % in a water bath at 80° C. The ball-milled powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to firing at 1,600° C. for I hour under nitrogen atmosphere, so as to prepare the amorphous carbon material with a particle diameter D5(=29 μm.

Example 3

The petroleum asphalt (with a carbon content of 86 wt %) having a softening point of 45° C. was mixed with kaolin ($Al_2O_3 \cdot 2Si_2 \cdot 2H_2O$) at a mass ratio of 99:1, the mixture was pulverized by a small-sized ultrafine grinder to obtain powder with particle diameter $D_{50}$=50 μm, the powder was then subjected to ball milling by an omnibearing planetary ball mill at a rotation speed of 300 rpm to obtain powder with $D_{50}$=10 μm.

The sodium carboxymethylcellulose was added to water and prepared into a solution with a concentration of 0.1 wt % in a water bath at 80° C. The ball-milled powder was added into the solution with the mass ratio 20:100 of the powder relative to the solution, the mixture was subjected to stirring at room temperature for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to firing at 900° C. for 20 hours under nitrogen atmosphere, so as to prepare the amorphous carbon material with a particle diameter $D_{50}$=13 μm.

Example 4

The coal pitch (with a carbon content of 93 wt %) having a softening point of 120° C. was mixed with kaolin ($Al_2O_3 \cdot 2SiO_2 \cdot 2H_2O$) at a mass ratio of 99.9:0.1, the mixture was pulverized by a small-sized ultrafine grinder to obtain powder with particle diameter $D_{50}$=12 μm.

The arabic gum was added to water and prepared into a solution with a concentration of 0.2 wt % in a water bath at 80° C. The powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 800° C. for 10 hours under nitrogen ($N_2$) atmosphere, the fired product was subjected to ball milling by an omnibearing planetary ball mill at a rotation speed of 280 rpm to obtain powder with $D_{50}$=6 μm. The powder was again placed in the tube furnace section of the OTF-1200X-80-III-F3LV system, subjected to firing at 1,200° C. for 6 hours under the nitrogen atmosphere, so as to prepare the amorphous carbon material with a particle diameter $D_{50}$=8 μm.

Example 5

The mesophase pitch (with a carbon content of 98 wt % and a mesophase content of 70%) having a softening point of 280° C. was mixed with kaolin ($Al_2O_3 \cdot 2SiO_2 \cdot 2H_2O$) at a mass ratio of 94:6, the mixture was pulverized by a small-sized ultrafine grinder to obtain powder with particle diameter $D_{50}$=100 μM, the powder was then subjected to ball milling by an omnibearing planetary ball mill at a rotation speed of 300 rpm to obtain powder with $D_{50}$=15 μm.

The cetyltrimethyl ammonium chloride ($C_{19}H_{42}ClN$) was added to water and prepared into a solution with a concentration of 10 wt % in a water bath at 80° C. The ball-milled powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 400° C. for 12 hours under nitrogen atmosphere, then heated to 1,100° C. and subjected to firing at the temperature for 8 hours so as to prepare the amorphous carbon material with a particle diameter $D_{50}$=18 μm.

Example 6

The coal (with a carbon content of 89 wt %) was mixed with aluminum silicate ($Al_2(SiO_3)_3$) according to a mass ratio of 95:5, the mixture was pulverized by a small-sized ultrafine grinder to obtain powder with particle diameter $D_{50}$=50 μm, the powder was then subjected to ball milling by an omnibearing planetary ball mill at a rotation speed of 300 rpm to obtain powder with $D_{50}$=10 μm.

The arabic gum was added to water and prepared into a solution with a concentration of 5 wt % in a water bath at 80° C. The ball-milled powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-111-F3LV system, subjected to pre-firing at 700° C. for 1 hour under nitrogen atmosphere, and further heated to 1,200° C. and subjected to firing at the temperature for 5 hours so as to prepare the amorphous carbon material with a particle diameter $D_{50}$=12 μm.

Comparative Example 1

The mesophase pitch (with a carbon content of 98 wt % and a mesophase content of 50%) having a softening point of 260° C. was mixed with silicon dioxide ($SiO_2$) at a mass ratio of 96:4, the mixture was pulverized by a small-sized ultrafine grinder to obtain powder with particle diameter $D_{50}$=50 μm, the powder was then subjected to ball milling by an omnibearing planetary ball mill at a rotation speed of 300 rpm to obtain powder with $D_{50}$=10 μm.

The arabic gum was added to water and prepared into a solution with a concentration of 2 wt % in a water bath at 80° C. The ball-milled powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 600° C. for 10 hours under nitrogen atmosphere, then heated to 1,300° C. and subjected to firing at the temperature for 8 hours so as to prepare the amorphous carbon material with a particle diameter $D_{50}$=14 μm.

Comparative Example 2

The mesophase pitch (with a carbon content of 98 wt % and a mesophase content of 50%) having a softening point of 260° C. was mixed with aluminum oxide ($Al_2O_3$) at a mass ratio of 96:4, the mixture was pulverized by a small-sized ultrafine grinder to obtain powder with particle diameter $D_{50}$=50 μm, the powder was then subjected to ball milling by an omnibearing planetary ball mill at a rotation speed of 300 rpm to obtain powder with $D_{50}$=10 μm.

The arabic gum was added to water and prepared into a solution with a concentration of 2 wt % in a water bath at 80° C. The ball-milled powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 600° C. for 10 hours under nitrogen atmosphere, then heated to 1,300° C. and subjected to firing at the temperature for 8 hours so as to prepare the amorphous carbon material with a particle diameter $D_{50}=15$ μm.

Comparative Example 3

The mesophase pitch (with a carbon content of 98 wt % and a mesophase content of 50%) having a softening point of 260° C. was mixed with aluminum silicate ($Al_2(SiO_3)_3$) at a mass ratio of 96:4, the mixture was pulverized by a small-sized ultrafine grinder to obtain powder with particle diameter $D_{50}=50$ μm, the powder was then subjected to ball milling by an omnibearing planetary ball mill at a rotation speed of 300 rpm to obtain powder with $D_{50}=10$ μm. The ball-milled powder was placed in the tube furnace section of the OTF-1200X-80-III-F3LV system, subjected to pre-firing at 600° C. for 10 hours under nitrogen atmosphere, then heated to 1,300° C. and subjected to firing at the temperature for 8 hours so as to prepare the amorphous carbon material with a particle diameter $D_{50}=13$ μm.

Comparative Example 4

The mesophase pitch (with a carbon content of 98 wt % and a mesophase content of 50%) having a softening point of 260° C. was pulverized by a small-sized ultrafine grinder to obtain powder with particle diameter $D_{50}=50$ μm, the powder was then subjected to ball milling by an omnibearing planetary ball mill at a rotation speed of 300 rpm to obtain powder with $D_{50}=10$ μm.

The arabic gum was added to water and prepared into a solution with a concentration of 2 wt % in a water bath at 80° C. The powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 600° C. for 10 hours under nitrogen atmosphere, then heated to 1,300° C. and subjected to firing at the temperature for 8 hours so as to prepare the amorphous carbon material with a particle diameter $D_{50}=13$ μm.

Comparative Example 5

The phenolic resin was mixed with aluminum silicate ($Al_2(SiO_3)_3$) were mixed at a mass ratio of 96:4, the mixture was pulverized by a small-sized ultrafine grinder to obtain powder with particle diameter $D_{50}=50$ μm, the powder was then subjected to ball milling by an omnibearing planetary ball mill at a rotation speed of 300 rpm to obtain powder with $D_{50}=10$ μm.

The arabic gum was added to water and prepared into a solution with a concentration of 2 wt % in a water bath at 80° C. The powder was added into the solution with the mass ratio 20:100 of the powder relative to the solution, the mixture was subjected to stirring at 80° C. for 4 hours and then standing still at normal temperature, the supernatant liquid was removed, the obtained solid was subjected to drying under vacuum at 120° C. for 12 hours. The dried powder was placed in the tube furnace section of the OTF-1200X-80-III-F3LV system, subjected to pre-firing at 600° C. for 10 hours under nitrogen atmosphere, then heated to 1,300° C. and subjected to firing at the temperature for 8 hours so as to prepare the amorphous carbon material with a particle diameter $D_{50}=12$ μm.

The carbon materials obtained in the above examples and comparative examples were subjected to characterization and performance tests, the results were shown in Table 1.

TABLE 1

| Numbers | $\rho$ (g/cm³) | Si (wt %) | Al (wt %) | $d_{002}$ (nm) | $L_c$ (nm) | $L_a$ (nm) | $L_c \times d_{002}$ | $100 \times (L_c/L_a^2)_3 \times d_{002}$ | $100 \times \rho \times d_{002}$ | Capacity (mAh/g) | Thermal diffusion coefficient (mm²·s⁻¹) |
|---|---|---|---|---|---|---|---|---|---|---|---|
| Example 1 | 2.02 | 1.18 | 0.78 | 0.38 | 1.495 | 4.519 | 0.57 | 0.402 | 76.76 | 258 | 0.141 |
| Example 2 | 2.16 | 0.63 | 0.39 | 0.363 | 1.451 | 4.369 | 0.53 | 0.364 | 78.41 | 280 | 0.134 |
| Example 3 | 2.08 | 0.28 | 0.26 | 0.376 | 1.374 | 4.542 | 0.52 | 0.354 | 78.21 | 296 | 0.138 |
| Example 4 | 2.11 | 0.05 | 0.04 | 0.362 | 1.298 | 4.650 | 0.47 | 0.285 | 76.38 | 260 | 0.162 |
| Example 5 | 1.99 | 1.34 | 1.29 | 0.373 | 1.315 | 4.651 | 0.49 | 0.315 | 74.23 | 285 | 0.179 |
| Example 6 | 2.25 | 1.55 | 1.01 | 0.392 | 1.395 | 4.659 | 0.55 | 0.387 | 88.20 | 278 | 0.155 |
| Comparative Example 1 | 1.99 | 1.28 | — | 0.370 | 1.690 | 4.030 | 0.63 | 0.527 | 73.63 | 239 | 0.127 |
| Comparative Example 2 | 2.00 | — | 0.76 | 0.369 | 1.600 | 4.150 | 0.59 | 0.467 | 73.80 | 236 | 0.124 |
| Comparative Example 3 | 1.89 | 1.16 | 0.75 | 0.355 | 1.933 | 3.950 | 0.69 | 0.554 | 67.10 | 230 | 0.089 |
| Comparative Example 4 | 1.99 | — | — | 0.376 | 1.550 | 4.453 | 0.58 | 0.416 | 74.82 | 238 | 0.112 |
| Comparative Example 5 | 1.73 | 1.31 | 0.92 | 0.395 | 1.671 | 4.002 | 0.66 | 0.643 | 68.34 | 190 | 0.072 |

As demonstrated by the results of Table 1, the amorphous carbon material prepared with the method of the present disclosure has desirable heat transfer properties and can provide high battery capacity.

The preferred embodiments of the present disclosure have been described above in detail, but the present disclosure is not limited thereto. Within the scope of the technical idea of the present disclosure, many simple modifications can be made to the technical solution of the present disclosure, including various technical features being combined in any other suitable way, and these simple modifications and combinations should also be regarded as the disclosure of the present disclosure, and all fall within the scope of the present disclosure.

The invention claimed is:

1. An amorphous carbon material, wherein:
   (1) a true density ρ of the amorphous carbon material and an interlayer spacing $d_{002}$ obtained by powder X-Ray Diffraction (XRD) spectrum analysis satisfy the following relational formula:

$$100 \times \rho \times d_{002} \geq 70 \quad \text{Formula (I);}$$

(2) the interlayer spacing $d_{002}$, $L_a$ and $L_c$ of the amorphous carbon material obtained by powder XRD spectrum analysis satisfy the following relational formula:

$$L_c \times d_{002} \leq 0.58 \quad \text{Formula (II), and}$$

$$100 \times (L_c/L_a^2) \times d_{002}^3 \leq 0.425 \quad \text{Formula (III);}$$

and
   (3) the amorphous carbon material contains 0.001-2% by weight of a silicon component and 0.001-2% by weight of an aluminum component in term of element, based on the total mass of the amorphous carbon material; and
   wherein ρ is denoted by the unit of g/cm³, and each of $d_{002}$, $L_c$ and $L_a$ is denoted by the unit of nm.

2. The amorphous carbon material of claim 1, wherein $100 \times \rho \times d_{002} \leq 120$.

3. The amorphous carbon material of claim 1, wherein $L_c \times d_{002} \leq 0.01$.

4. The amorphous carbon material of claim 1, wherein $100 \times (L_c/L_a^2) \times (d_{002})^3 \geq 0.1$.

5. The amorphous carbon material of claim 1, wherein the amorphous carbon material has a thermal diffusion coefficient larger than or equal to 0.09 mm²·s⁻¹.

6. The amorphous carbon material of claim 1, wherein the amorphous carbon material is in the form of powder having a particle size $D_{50}$ within a range of 2-50 μm.

7. A method for preparing the amorphous carbon material of claim 1 comprising the following steps:
   (1) providing a carbonaceous material powder having a carbon element content larger than 70%;
   (2) providing a silicon-aluminum source, wherein the silicon-aluminum source is a combination of a silicon-containing substance and an aluminum-containing substance, or a substance containing both silicon and aluminum:
   (3) mixing the carbonaceous material powder, the silicon-aluminum source, and an aqueous solution containing a surfactant, then subjecting the mixture to a phase separation, and drying the obtained solid to obtain a dried powder; and
   (4) carbonizing the dried powder under vacuum or an inert atmosphere.

8. The method of claim 7, Wherein the Carbonaceous Material Powder has an Average Particle diameter $D_{50}$ within a range of 1-100 μm.

9. The method of claim 7, wherein the concentration of surfactant in the surfactant-containing aqueous solution is 0.001-50 wt;
   wherein the surfactant is used in an amount of 0.005-250 parts by weight, relative to 100 parts by weight of the carbonaceous material powder.

10. The method of claim 7, wherein the surfactant is selected from an anionic surfactant and/or a cationic surfactant;
    wherein the anionic surfactant is at least one selected from the group consisting of arabic gum, sodium carboxymethylcellulose, C8-C12 fatty acid salts, C12-C20 alkyl sulfonate salts, alkyl benzene sulfonate salts, and C12-C18 fatty alcohol sulfate salts; and
    wherein the cationic surfactant is at least one selected from the group consisting of the C10-C22 alkyltrimethylammonium type cationic surfactants, the di-(C10-C22) alkyldimethylammonium type cationic surfactants, and the C10-C22 alkyldimethylbenzylammonium type cationic surfactants.

11. The method of claim 7, wherein the carbonization in step (4) is conducted at a temperature within a range of 900-1,600° C. for a time within a range of 1-20 hours.

12. The method of claim 7, wherein the method further comprises: performing ball milling at any stage between step (1) and step (4) such that the powder entering the carbonization process has an average particle diameter $D_{50}$ within a range of 1-50 μm.

13. A method of preparing the amorphous carbon material of claim 1 as a material for mechanical parts, a battery electrode material or a heat conduction material.

14. The method of claim 8, wherein the carbonaceous material selected from the group consisting of pitch, coal, coke, and a combination thereof.

15. The method of claim 8, wherein the material containing both silicon and aluminum is at least one selected from the group consisting of silicon-aluminum composite oxide, aluminosilicate, zeolite, kaolin and fly ash.

16. The method of claim 11, wherein the method further comprises: pre-firing the dried powder under vacuum or an inert atmosphere before the carbonization treatment in the step (4), wherein the pre-firing is conducted at a temperature within a range of 400-800° C. for a time within a range of 1-12 hours.

* * * * *